(12) United States Patent

Mueller et al.

(10) Patent No.: US 12,614,819 B2

(45) Date of Patent: Apr. 28, 2026

(54) METHOD AND DEVICE FOR PARALLELING ENERGY SOURCES

(71) Applicant: Custom Electronics, Inc., Oneonta, NY (US)

(72) Inventors: Eduard K. Mueller, Ballston Lake, NY (US); Shawn Morris, Worcester, NY (US); Kyle J. DeStefano, Oneonta, NY (US); Zack Thomas Joseph, West Oneonta, NY (US); Johnathan A. Rozanski, Mount Vision, NY (US)

(73) Assignee: Custom Electronics, Inc., Oneonta, NY (US)

( * ) Notice: Subject to any disclaimer, the term of this patent is extended or adjusted under 35 U.S.C. 154(b) by 774 days.

(21) Appl. No.: 17/888,747

(22) Filed: Aug. 16, 2022

(65) Prior Publication Data

US 2023/0055357 A1 Feb. 23, 2023

Related U.S. Application Data

(60) Provisional application No. 63/234,184, filed on Aug. 17, 2021.

(51) Int. Cl.
*H01M 50/512* (2021.01)
*H01M 10/42* (2006.01)
(Continued)

(52) U.S. Cl.
CPC ....... *H01M 50/512* (2021.01); *H01M 10/425* (2013.01); *H01M 10/441* (2013.01);
(Continued)

(58) Field of Classification Search
CPC ............. H01M 50/512; H01M 50/574; H01M 50/505; H01M 10/425; H01M 10/441; H01M 10/482; H01M 2010/4271
See application file for complete search history.

(56) References Cited

U.S. PATENT DOCUMENTS

2003/0077494 A1* 4/2003 Aberle ................ H01M 16/006
429/7
2004/0126635 A1* 7/2004 Pearson .............. H01M 8/0488
429/430

(Continued)

FOREIGN PATENT DOCUMENTS

CN 114567037 A * 5/2022 ............ H02J 7/0019
EP 3261161 A1 * 12/2017 ............ H01M 16/00

(Continued)

OTHER PUBLICATIONS

CN 11456703 MT (Year: 2022).*

*Primary Examiner* — Alexander Usyatinsky

(74) *Attorney, Agent, or Firm* — Hoffman Warnick LLC

(57) ABSTRACT

An energy storage system is provided, including: a plurality of energy storage devices, wherein each energy storage device includes an energy source; a junction unit for connecting the plurality of the energy storage devices in parallel to a common power bus, the junction unit including a control circuit; a power conversion unit coupled to the common power bus; and protection circuitry coupled to the control circuit for preventing current from one of the energy storage devices from flowing to another of the energy storage devices.

19 Claims, 5 Drawing Sheets

(51) Int. Cl.
  *H01M 10/44*      (2006.01)
  *H01M 10/48*      (2006.01)
  *H01M 50/505*      (2021.01)
  *H01M 50/574*      (2021.01)

(52) U.S. Cl.
  CPC ....... *H01M 10/482* (2013.01); *H01M 50/505*
          (2021.01); *H01M 50/574* (2021.01); *H01M*
                    *2010/4271* (2013.01)

(56) References Cited

U.S. PATENT DOCUMENTS

2013/0113294 A1\*   5/2013   Kaplan ..................... H02J 3/28
                                               307/82
2018/0323450 A1\*   11/2018   King ................ H01M 8/04947

FOREIGN PATENT DOCUMENTS

JP        2011504285 A  \*   2/2011   .......... H02J 7/00036
JP        2019509611 A  \*   4/2019   .......... H02J 7/00036
KR     20230052358 A  \*   4/2023   ................ H02J 7/35

\* cited by examiner

METHOD AND DEVICE FOR PARALLELING ENERGY SOURCES

BACKGROUND OF THE INVENTION

1. Technical Field

The present disclosure is directed to an energy storage control system and related operational methodologies

2. Background Art

High-energy sources, such as lithium iron phosphate (LiFePO$_4$) battery packs containing several series-connected cells, can be connected to other packs of the same type in series, parallel, or a combination thereof to achieve higher power or energy output levels. In most cases, a series connection of such packs is used in applications where batteries are intended to be reconfigured during use, due to inherent issues associated with varying voltage and power output levels encountered during parallel operation. For example, parallel operation of such battery packs presents the problem that large amounts of energy may be "dumped" from a unit having a higher state of charge to another unit parallel to it but having a lower state of charge. To avoid this issue, battery suppliers often caution end-users not to connect the battery packs in parallel, instead intending battery packs to be used alone or to be connected in series with other battery packs before being connected to a single inverter. A major drawback to the use of series-connected (or even single) battery packs is that, when one of the battery packs is depleted, the entire system must be shut down in order to exchange the depleted battery pack with a fully charged one. This disrupts the power to the load for the time needed to exchange battery packs.

SUMMARY

The present disclosure is directed to a modular, scalable, mobile, semi-stationary energy storage system that permits parallel connection of energy sources during use, allowing for continuous energy delivery to a given load. The system may include a junction box that allows for active or passive current sharing among parallel-connected energy sources. According to embodiments of the disclosure, the junction box may be configured to operate as a battery management system (BMS). In addition to a junction box, the system may include: (a) an inverter having a common direct current (DC) input bus, (b) at least one energy storage device (ESD) (e.g., a battery pack), and (c) a charger. The junction box allows any number of ESDs (e.g., four) to be connected in parallel at the same time. A larger system may include a plurality of junction boxes (and associated circuitry) interconnected by appropriate power cables.

According to embodiments of the disclosure, each ESD may include its own BMS and an internal connection relay that can be used to connect or disconnect the output of the ESD to the junction box. If one of the ESDs is depleted before the others, it can be disconnected from the system via a key switch located on the ESD itself, and its output cable can then be removed from the inverter and connected to the charger, allowing for the depleted ESD to be recharged while the remaining ESDs continue to deliver power to the inverter and, in turn, to the load.

In the case where the inverter, charger, and ESDs are all housed in separate enclosures, the connections from these units may be made to the system through the junction box, which may include active or passive means for preventing unwanted backflow of current into the ESDs. The junction box, in turn, may include a single cable as an output, which connects to the inverter. In the event that DC power is required by the load instead of AC power, the inverter can be replaced directly by the load or by a DC-DC converter unit that raises or lowers the DC output of the junction box to the voltage level required by the load. The junction box may be provided separately of the system, independent of what type of ESDs, inverters, chargers, or loads are used. In some embodiments, a separate charger could be integrated into each of the ESDs, eliminating the need for a separate charger, or a charger-inverter combination unit could be included with the inverter. This allows for the charging and discharging of different ESDs at the same time.

According to an aspect of the disclosure, there is provided an energy storage system including: a plurality of energy storage devices, wherein each energy storage device includes an energy source; a junction unit for connecting the plurality of the energy storage devices in parallel to a common power bus, the junction unit including a control circuit; a power conversion unit coupled to the common power bus; and protection circuitry coupled to the control circuit for preventing current from one of the energy storage devices from flowing to another of the energy storage devices.

According to another aspect of the disclosure, there is provided a method for supplying current from a plurality of energy storage devices to a power bus, including: connecting the plurality of the energy storage devices in parallel to a power bus; and preventing current from flowing from any of the energy storage devices having too low of a voltage to the power bus, wherein the preventing comprises, for each energy storage device: coupling a protection circuit between the energy storage device and the power bus; measuring a voltage provided by the energy storage device; comparing the voltage provided by the energy storage device to a predetermined voltage level; and selectively decoupling the energy storage device from the power bus if the measured voltage provided by the energy storage device is lower than the predetermined voltage level.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

DETAILED DESCRIPTION

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

According to embodiments of the disclosure, an energy storage system is provided in which a plurality of energy storage devices (ESDs) may be connected in parallel via a junction box to a direct current to alternating current (DC-to-AC) inverter, DC-to-DC converter, or load, independently of variations in the output voltage of each ESD. The junction box is provided with protection circuitry to prevent the flow of power from one ESD another ESD, eliminating the possibility of large over-current events. The junction box further allows for active or passive control of current flow.

Figure 1:
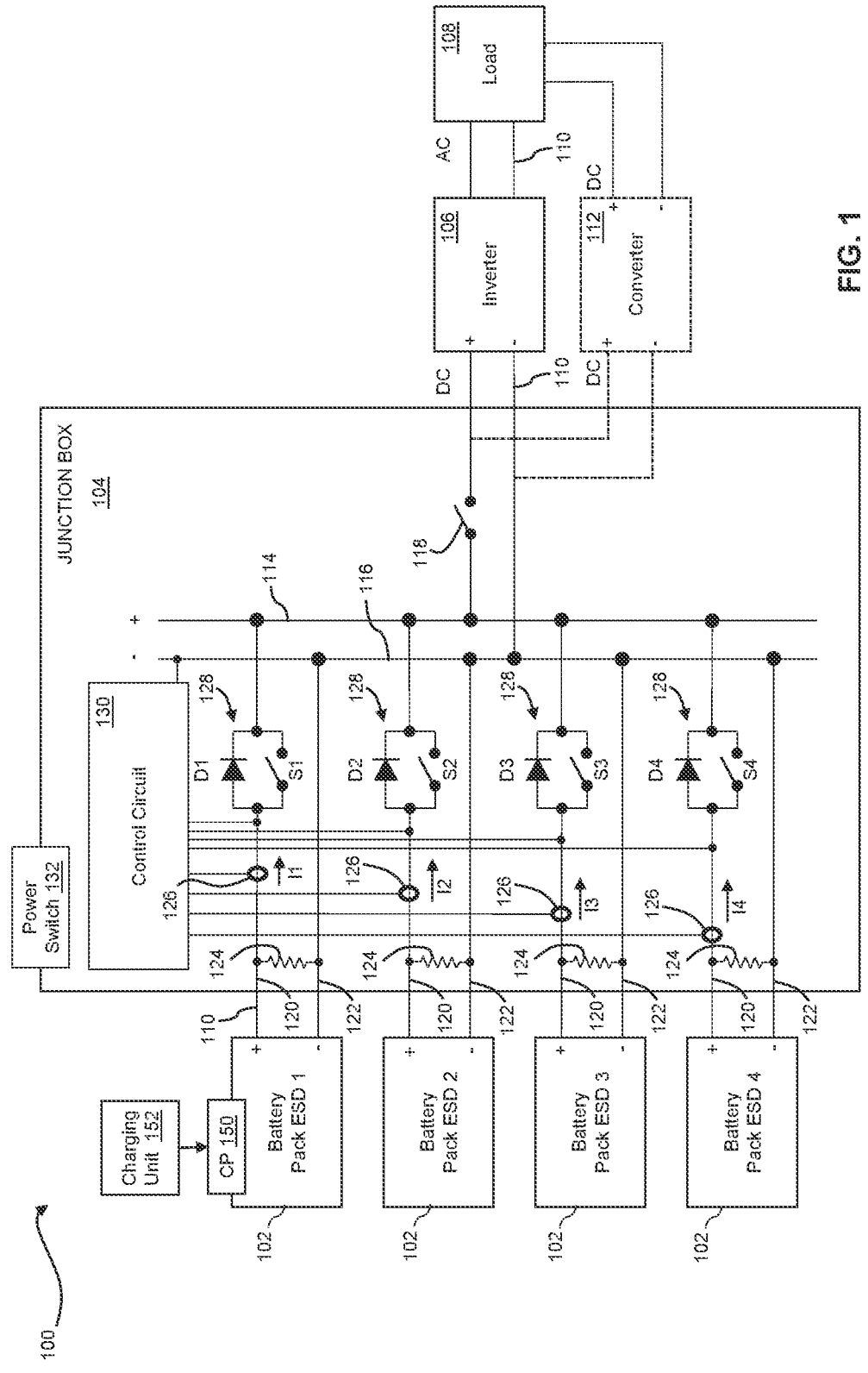
FIG. 1 shows a schematic view of an energy storage system including a plurality of energy storage devices (ESDs) connected in parallel to a junction box and associated internal control and protection circuitry according to embodiments of the disclosure.

FIG. 1 shows a schematic view of an energy storage system 100 including a plurality of energy storage devices (ESDs) 102 (e.g., battery packs) connected in parallel to a junction box 104 and associated internal control and protection circuitry according to embodiments of the disclosure. The energy storage system 100 provides active control of the ESDs 102.

The energy storage system 100 depicted in FIG. 1 includes four ESDs 102 (e.g., ESD 1, ESD 2, ESD 3, ESD 4), although any number of ESDs 102 may be included. As shown, each of the ESDs 102 is connected to the junction box 104, which in turn is connected to a DC-to-AC inverter 106 connected to a load 108 via cables 110. As shown in phantom in FIG. 1, according to other embodiments of the disclosure, the junction box 104 may instead be connected to the load 108 through a DC-to-DC converter 112.

The junction box 104 allows the shared flow of electrical current from the ESDs 102 to a common positive DC bus 114 and return (ground) bus 116. The positive DC bus 114, in turn, is connected to the input of the DC-to-AC inverter 106 (or DC-to-DC converter 112), the output of which is connected to the load 108. An optional DC bus relay 118 may be provided to disconnect the positive DC bus 114 (and all of the ESDs 102) from the DC-to-AC inverter 106 (or DC-to-DC converter 112) and the load 108 (e.g., in the event that a fault condition is detected).

As depicted in FIG. 1, each ESD 102 is connected to respective positive and negative input leads 120, 122 of the junction box 104. A pull-down resistor 124 may be provided between each set of the positive and negative input leads 120, 122 to maintain a zero voltage between the positive and negative input leads 120, 122 in the event that an ESD 102 is not connected to the junction box 104, leaving an open slot.

Current monitors 126, such as Hall-effect devices, may be provided on each positive input lead 120 in the junction box 104. A parallel combination 128 of a blocking (or OR-ing) diode D (e.g., D1-D4) and a switch S (e.g., S1-S4) may be provided on each positive input lead 120 to regulate current flow from the ESDs 102 to the positive DC bus 114 and return (ground) bus 116. A control circuit 130 is connected to the positive input leads 120 (e.g., via voltage taps), the current monitors 126, the switches S (e.g., S1-S4), diodes D (e.g., D1-D4), and the DC bus relay 118. The control circuit 130 is also coupled to the return (ground) bus 116.

Figure 2:
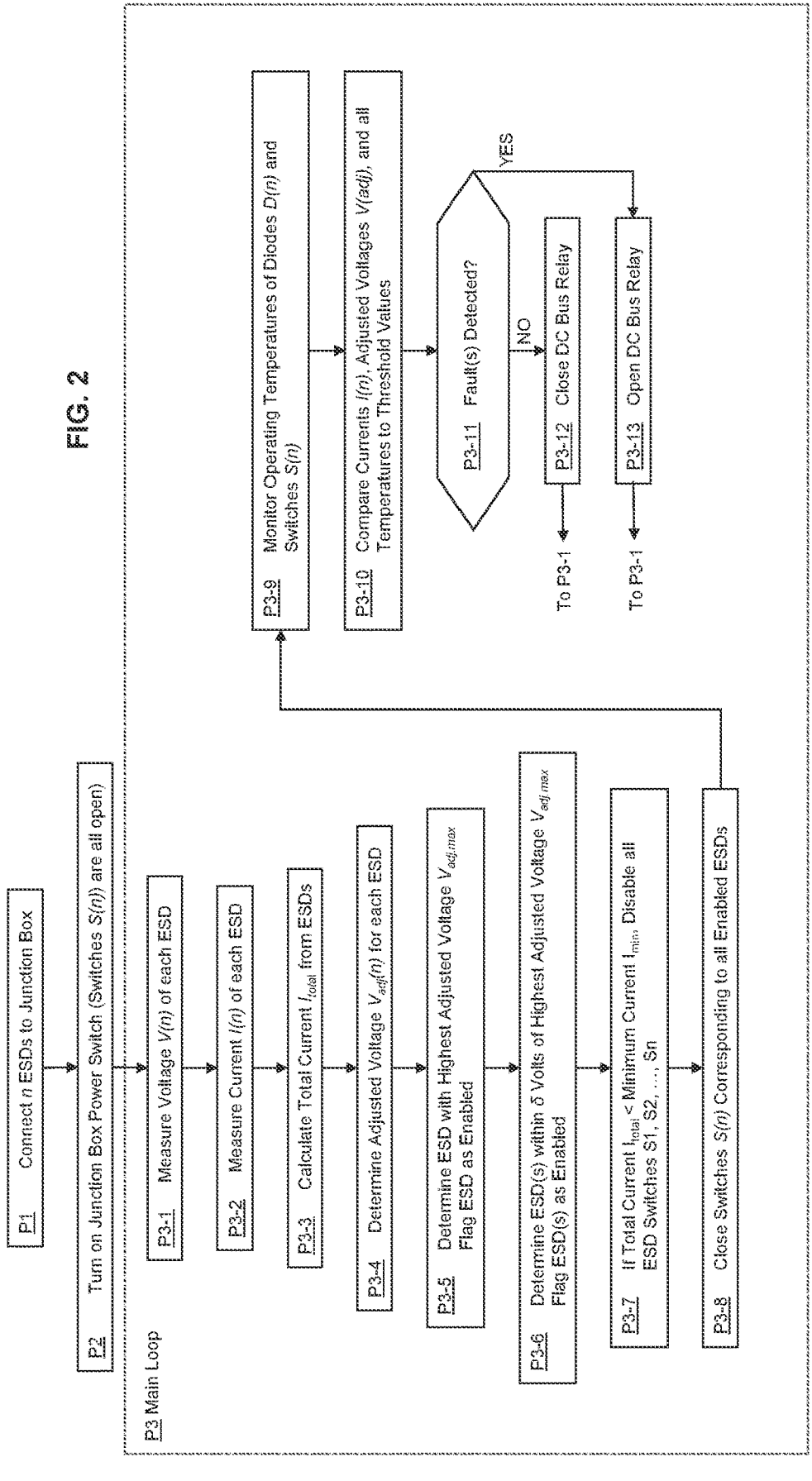
FIG. 2 provides an illustrative flow diagram of a process carried out by the energy storage system of FIG. 1, in which the junction box operates as a battery management system (BMS) according to embodiments of the disclosure.

FIG. 2 provides an illustrative flow diagram of a process carried out by the energy storage system 100 of FIG. 1, in which the junction box 104 operates as a battery management system (BMS) according to embodiments of the disclosure. At process P1, at least one and up to n ESDs 102 are connected to the junction box 104 via cables 110. At process P2, an optional power switch 132 may be used to turn on/off the junction box 104. The power switch 132 is optional since the power to the control circuit 130 may be supplied by the ESDs 102 (generally through a DC-DC converter or regulator inside the control circuit 130). In the initial condition, all switches S (S1-S4) and the DC bus relay 118 are in an open state.

Once powered on (e.g., via power switch 132), the control circuit 130 enters a main control loop at process P3. At process P3-1, the voltage V(n) of each ESD 102 (e.g., 1 through n) at the positive input lead 120 is measured by the control circuit 130. At process P3-2, the current monitors 126 provide a measurement to the control circuit 130 of the current I(n) flowing from each ESD 102. If the voltage of an ESD 102 measures as zero or near-zero voltage, that ESD 102 is considered to be physically disconnected and its connection slot is considered to be open by the control circuit 130.

At process P3-3, the measurements of the currents $1(n)$ flowing from the ESDs 102 (1 through n), as measured by the current monitors 126, are summed by the control circuit 130 to calculate the total current $I_{total}$ being drawn by the load 108. Next, at process P3-4, the control circuit 130 determines an adjusted voltage $V_{adj}(n)$ for each ESD 102. The adjusted voltage $V_{adj}(n)$ for each ESD 102 accounts for the voltage drop of the ESD 102 due to its internal resistance. This provides the unloaded voltage of each ESD 102. The adjusted voltage $V_{adj}(n)$ of each ESD 102 is given by:

$$V_{adj}(n) = V(n) + (I(n)*R(n)),$$

where R(n) is the internal resistance of the ESD 102, which may be either set as a programmed value or can be entered (e.g., by the user) via the control circuit 130. Further adjustment of the adjusted voltage $V_{adj}(n)$ of each ESD 102 may be provided to account for the forward voltages of diodes D and/or switch losses (e.g., on-state resistance of switches S), or other parasitic losses within the system.

At process P3-5, the control circuit 130 determines which ESD 102 has the highest adjusted voltage $V_{adj,max}$ and flags that ESD 102 as "enabled." For example, if the ESD 102 labeled "ESD 2" in FIG. 1 has the highest adjusted voltage $V_{adj,max}$, then the control circuit 130 flags ESD 2 as "enabled." Then, at process P3-6, the control circuit 130 identifies any other ESDs 102 having an adjusted voltage $V_{adj}(n)$ within a preset range of $\delta$ volts of the highest adjusted voltage $V_{adj,max}$ and flags those ESDs 102 as "enabled." That is, any ESD 102 with an adjusted voltage of:

$$V_{adj}(n) \geq V_{adj,max} - \delta$$

is flagged as "enabled." For example, if the ESDs 102 labeled "ESD 1" and "ESD 4" in FIG. 1 have a voltage within 5V of the highest adjusted voltage $V_{adj,max}$, then the control circuit 130 flags ESD 1 and ESD 4 as "enabled." If, on the other hand, the adjusted voltage $V_{adj}(n)$ of an ESD 102 is too low (i.e., $V_{adj}(n)<V_{adj,max}-\delta$), that ESD 102 is flagged as "disabled" by the control circuit 130. Thus, the condition for an ESD 102 to be flagged as "enabled" is that the adjusted voltage $V_{adj}(n)$ of the ESD 102 lies between $V_{adj,max}$ and $V_{adj,max}-\delta$.

At process P3-7, all of the ESDs 102 are flagged as "disabled" in the event that the total current $I_{total}$ calculated in process P3-3 is below some pre-determined minimum current $I_{min}$ (e.g., 0.5 A). This is an optional step that disables all ESDs 102 in the event that the load 108 is not drawing any current. This has several purposes, for example: (a) to prevent a sudden surge of current from the ESDs 102; and (b) to keep the ESDs 102 disabled when the current is essentially zero amps but the measured current reflects small fluctuations present due to noise. In most cases, this step will not be necessary.

At process P3-8, each of the switches S corresponding to the ESDs 102 that have been flagged as "enabled" are closed in response to instructions from the control circuit 130, thereby shorting out the associated diodes D. For the ESDs 102 that have been flagged as "disabled," the corresponding switches S, remain open. At this point, the DC bus relay 118 is still open, so current is not yet supplied to the DC-to-AC inverter 106 (or DC-to-DC converter 112), or load 108.

At process P3-9, the control circuit 130 monitors the operating temperatures of key components in the system, especially those of the diodes D and switches S. At process P3-10, the control circuit 130 compares the adjusted voltages $V_{adj}(n)$ of the ESDs 102, measured currents, and operating temperatures to preset threshold values. If no thresholds are transgressed (NO at process P3-11), and therefore no faults are detected, the control circuit 130 sends a signal to closes the DC bus relay 118 (or the "close" signal is maintained if the relay is already closed) at process P3-12. This allows current to pass from the enabled ESDs 102 to the DC-to-AC inverter 106 (or DC-to-DC converter 112) and the load 108. Flow then passes back to process P3-1. If, however, one or more of these thresholds is transgressed, and therefore faults are detected (YES at process P3-11), the control circuit 130 sends a signal to open the DC bus relay 118 at process P3-13 (or leaves it open in the case that it is already open). Flow then passes back to process P3-1. The above-described thresholds are application/component specific and may depend, for example, on the materials used to fabricate the various components in the system.

In some cases, the under-voltage condition for an ESD 102 may not be used for fault detection, as the corresponding diode D would prevent the flow of current and therefore further current drain from that ESD 102, as long as there is another ESD 102 in the system that has a significantly higher voltage. Therefore, an additional requirement in process P3-10 may be to set a fault condition if the voltage of any of the ESDs 102 is below the under-voltage threshold and the maximum voltage measured of the ESDs 102 is below some other preset minimum voltage level.

Figure 3:
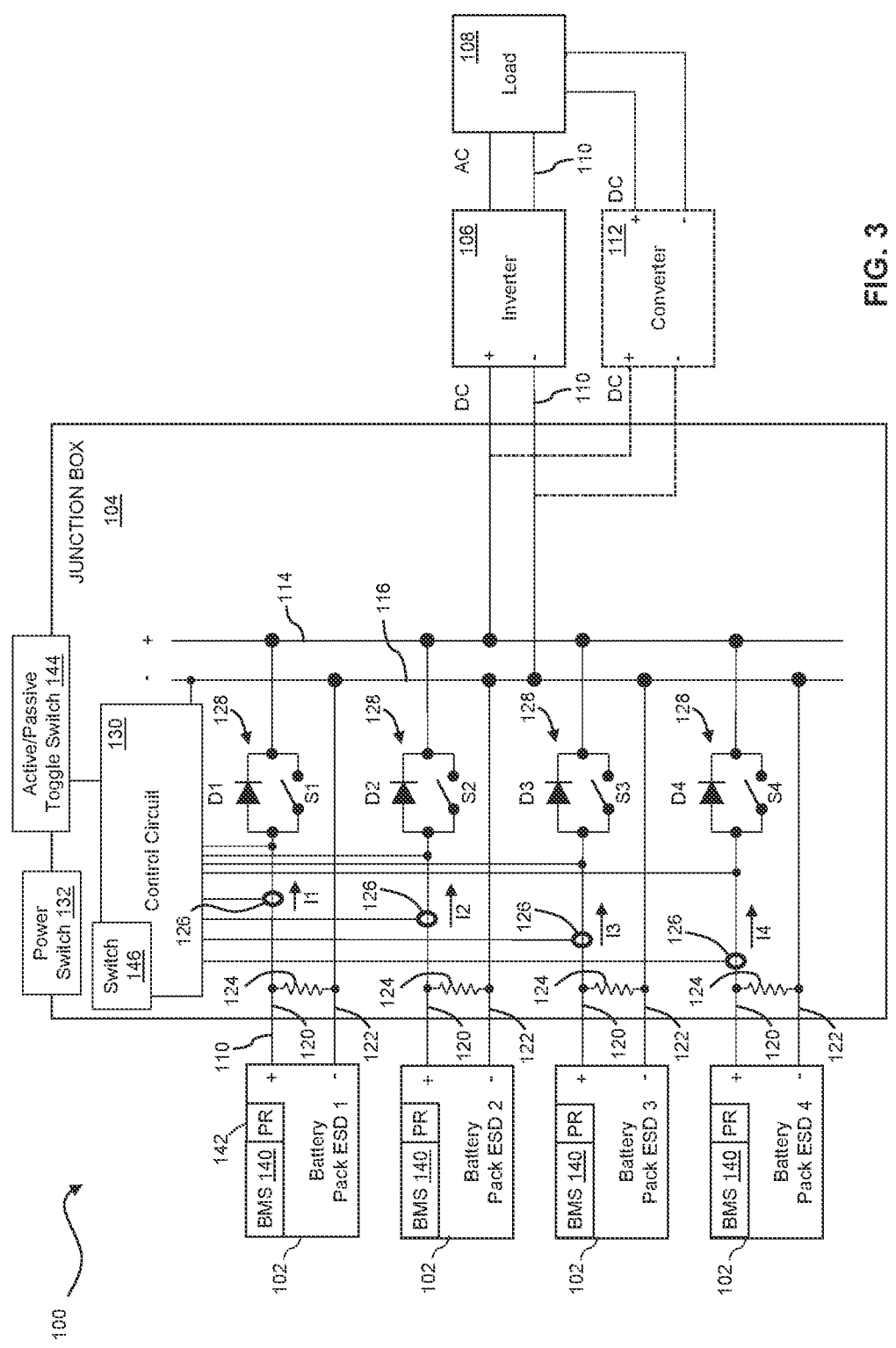
FIG. 3 shows a schematic view of an energy storage system including a plurality of energy storage devices (ESDs) connected in parallel to a junction box and associated internal control and protection circuitry according to an additional embodiment of the disclosure.

The junction box 104 in FIG. 1 functions as a battery management system in that it can only detect over- or under-voltage conditions at the ESD 102 level, not at the cell level (since many ESDs 102 include a number of series-connected cells). In many cases, this represents adequate protection of the ESDs 102, but in other cases, cell-level protection is necessary. One solution is to provide separate battery management systems (BMSs) 140 inside each of the ESDs 102 that monitor voltages, temperatures, and currents at the cell level as shown in FIG. 3. Each ESD 102 would then need its own means of being electrically disconnected from the junction box, such as a power relay 142 internal to each ESD 102. When each ESD 102 has its own power relay 142, the DC bus relay 118 internal to the junction box 104 is no longer necessary and can be replaced with a short circuit as shown in FIG. 3. This may provide several advantages, including, for example, a reduction in the cost of the junction box 104 and passive control of the currents in addition to active control.

Passive control of the currents in the junction box 104 in the energy storage system 100 depicted in FIG. 3 may be provided by the diodes D, with a diode D in series with the positive terminal of each ESD 102 and all of the switches S in an open state. The cathodes of the diodes D are connected to the positive DC bus 114 that feeds the DC-to-AC inverter 106 (DC-to-DC converter 112). In this case, if one of the four shown paralleled ESDs 102 is at a lower state of charge (i.e., voltage) than the other three, it will simply cease to supply current (or supply less current) to the positive DC power bus 114 and negative (ground bus) 116 while the remaining ESDs 102 each deliver more current to the DC-to-AC inverter 106 (DC-to-DC converter 112) and the load 108. The passive mode can be useful in electrically noisy environments, or in other conditions where performance of the control circuit 130 may be non-optimal.

Figure 4:
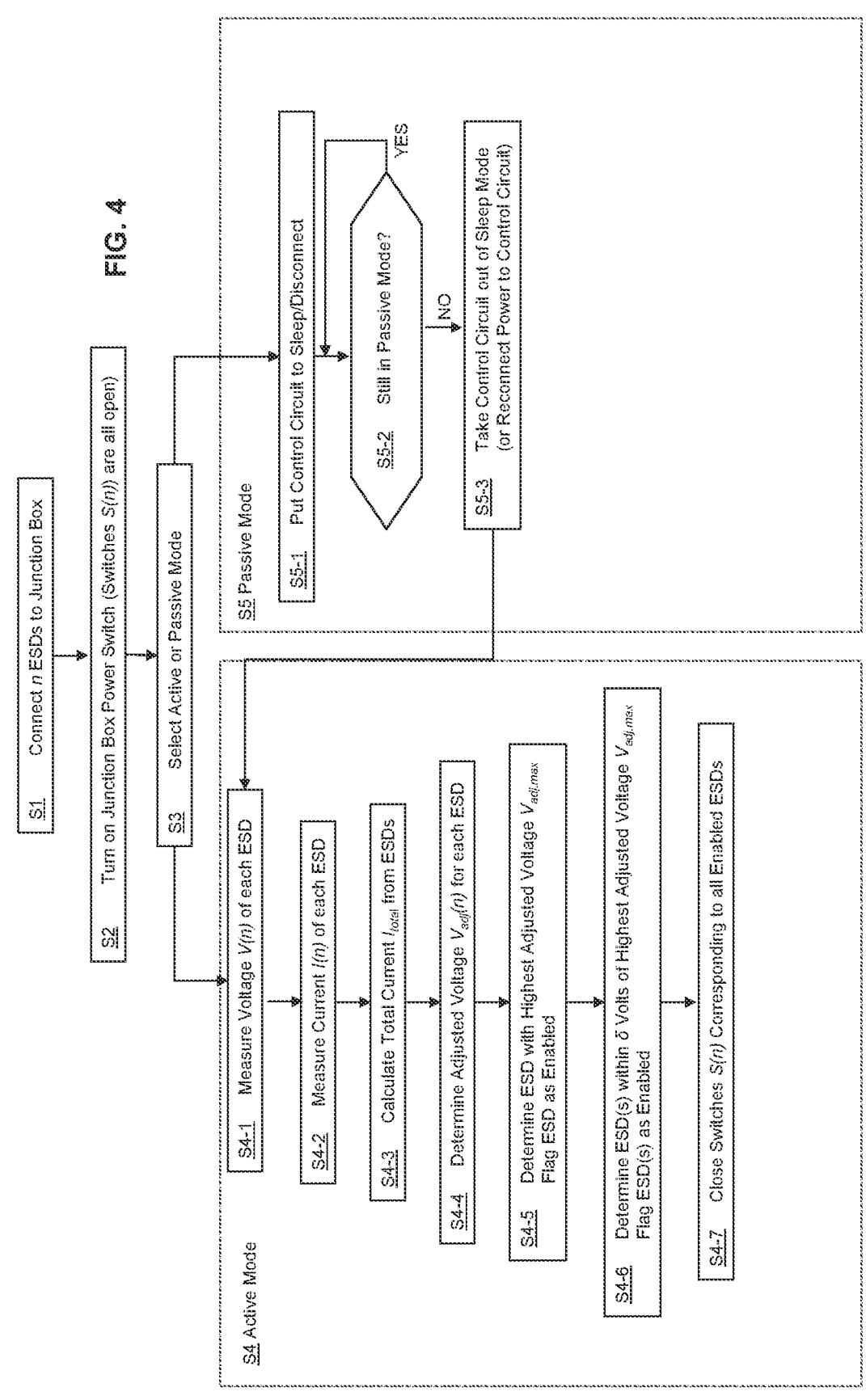
FIG. 4 provides an illustrative flow diagram of a process carried out by the energy storage system of FIG. 3, in which the DC bus relay is shorted allowing for active or passive control of the current flow from the ESDs according to embodiments of the disclosure.

FIG. 4 provides an illustrative flow diagram of a process carried out by the energy storage system 100 of FIG. 3, in which the DC bus relay 118 is removed or shorted allowing for selective active or passive control of the current flow from the ESDs 102 according to embodiments of the disclosure. At process S1, at least one and up to n ESDs 102 are connected to the junction box 104 via cables 110. At process S2, a power switch 132 may be used to turn on/off the junction box 104. At process S3, active or passive control is selected (e.g., via a manual toggle switch 144 on the junction box 104).

If the passive mode is selected in process S3, flow passes to process S5-1, where the control circuit 130 can be put to sleep, disconnected, or powered off (e.g., via power/sleep switch 146), thereby reducing overall power consumption. In process P5-2, if still in a passive mode (YES at process S5-2), the control circuit 130 does not need to do anything and can remain off or in sleep mode. While in the passive mode, there is an inherent diode voltage drop in the diodes D, which dissipates some of the energy stored in the corresponding ESDs 102. However, such energy dissipation is generally minimal, which is tolerable in most applications.

If the active mode is engaged (NO at process S5-2), flow passes to process S5-3. At process S5-3, the control circuit 130 is taken out of sleep mode (or reconnected to power) and flow passes to process S4-1.

At process S4-1, the voltage V(n) of each ESD 102 (e.g., 1 through n) at the positive input lead 120 is measured by the control circuit 130. At process S4-2, the current monitors 126 provide a measurement of the current I(n) flowing from each ESD 102 to the control circuit 130. If the voltage of an ESD 102 measures as zero or near-zero voltage, that ESD 102 is considered to be physically disconnected and its connection slot is considered to be open by the control circuit 130.

At process S4-3, the measurements of the currents 1(n) flowing from the ESDs 102 (1 through n), as measured by the current monitors 126, are summed by the control circuit 130 to calculate the total current $I_{total}$ being drawn by the load 108. Next, at process S4-4, the control circuit 130 determines the adjusted voltage $V_{adj}(n)$ for each ESD 102. As described above with regard to FIG. 2, the adjusted voltage $V_{adj}(n)$ of each ESD 102 is given by:

$$V_{adj}(n)=V(n)+(I(n)*R(n)),$$

where R(n) is the internal resistance of the ESD 102, which may be either set as a programmed value or can be entered (e.g., by the user) via the control circuit 130.

At process S4-5, the control circuit 130 determines which ESD 102 has the highest adjusted voltage $V_{adj,max}$ and flags that ESD 102 as "enabled." Then, at process S4-6, the control circuit 130 identifies any other ESDs 102 having an adjusted voltage $V_{adj}(n)$ within a preset range of 5 volts of the highest adjusted voltage $V_{adj,max}$ and flags those ESDs 102 as "enabled." That is, any ESD 102 with an adjusted voltage of:

$$V_{adj}(n)\geq V_{adj,max}-\delta$$

is flagged as "enabled." If, on the other hand, the adjusted voltage $V_{adj}(n)$ of an ESD 102 is too low (i.e., $V_{adj}(n)<V_{adj,max}-\delta$), that ESD 102 is flagged as "disabled." Thus, the condition for an ESD 102 to be flagged as "enabled" is that the adjusted voltage $V_{adj}(n)$ of that ESD 102 lies between $V_{adj,max}$ and $V_{adj,max}-\delta$. At process S4-7, each of the switches S corresponding to the ESDs 102 that have been flagged as "enabled" are closed in response to instructions from the control circuit 130, thereby shorting out the associated diodes D, and any switches corresponding to "disabled" ESDs 102 are opened (or remain in an open state). Flow then passes back to process S4-1.

One difference in the active operation mode (compared to FIG. 2) is that there is no fault condition that can be set, as this function is performed by the BMSs 140 internal to each of the ESDs 102. Regardless of operating mode or configuration, it is desirable to keep all cables 110 leading from the ESD's 102 to the junction box 104 at the same length in order to reduce voltage discrepancies at the positive DC bus 114 due to resistive voltage drops in the cables 110.

Figure 5:
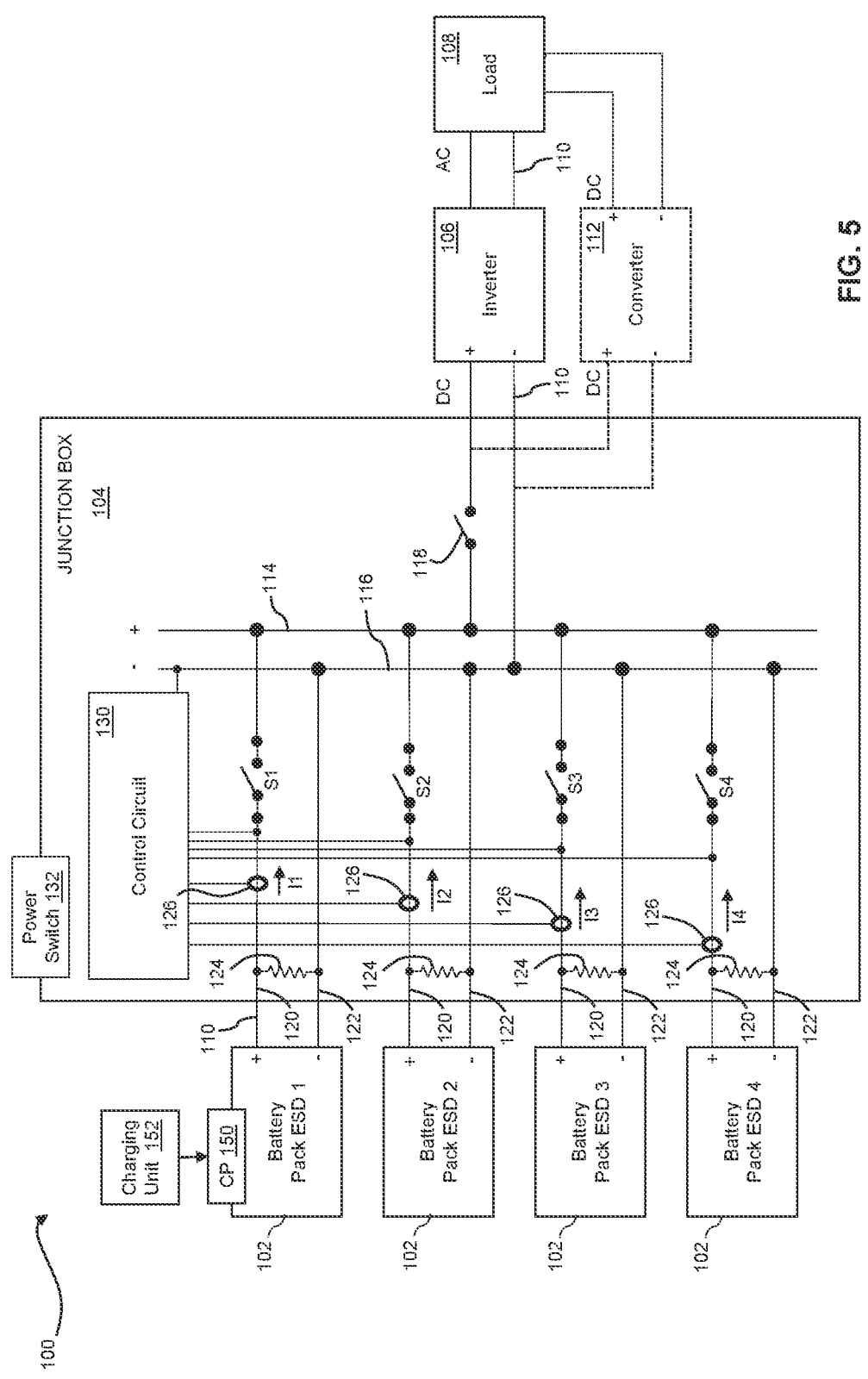
FIG. 5 shows a schematic view of an energy storage system including a plurality of energy storage devices (ESDs) connected in parallel to a junction box and associated internal control and protection circuitry according to another embodiment of the disclosure.

According to another embodiment according to the disclosure, only an active mode is provided in which the diodes D can be removed as depicted in FIG. 5. To this extent, the switches S are used as described above to prevent any current flow from the ESDs 102 having too low a voltage.

In general, an energy storage system 100 according to embodiments of the disclosure may also include the following features: (a) a key switch or other kind of switch that can be used to electrically disconnect the ESDs 102 from the load, although these may be incorporated into the ESDs 102 themselves and may not be necessary in the junction box 104; and (b) an optional master key switch or other type of switch located in the DC-to-AC inverter 106 that may be used to connect all ESDs 102 to the DC power bus 114 via wireless or wired means.

The ESDs 102 may also include a charge port 150 (FIG. 1) for connecting a charging unit 152, wherein the charge port 150 may lead to the terminals of the ESDs 102 through a blocking diode, relay, or solid-state switch (such as a MOSFET or IGBT). Renewable energy sources, such as solar or wind, may also be used to charge the ESDs 102 via appropriate charge ports in each of the ESDs 102, which may require a separate blocking diode to eliminate the possibility of energy flowing from an ESD 102 back into the charging energy source. The charge ports 150 may also be diode OR'd with another charge port used for connection to a conventional AC-operated charger so that the batteries or energy sources can be charged by either or both charging sources (conventional charger and renewable charging energy source) at once. Additional output ports, including but not limited to USB ports for charging cell phones and computers, may also be included in the junction box 104 to provide low-current DC output in addition to the high-current power being supplied to the main inverter or converter.

Referring to FIGS. 1 and 3, the switches S may be MOSFETs, IGBTs, relays, or other kinds of switches whose gates are controlled via the control circuit 130. A separate driver circuit, especially one having an isolated gate drive signal, may be necessary. The diodes S are of the high-current Schottky type, having a relatively low forward voltage drop. Proper heatsinking should be employed for the switches S and the diodes D to prevent overheating of any components within the junction box 104. The current monitors 126 may be of any type, such as Hall-effect sensors. The input resistors 124 may have a resistance of about 10 kΩ, and are provided to pull a positive input lead 120 to ground in the case where no ESD 102 is connected to that port, thereby ensuring that the control circuit 130 measures zero volts when a ESD 102 is disconnected. The voltage taps connecting the control circuit 130 to the positive input leads 120 should be on the anode side of the diodes D and are referenced to the common ground to which all ESDs 102 are tied via their negative leads. The cables 110 should be appropriately sized for the maximum current and may be terminated in any preferred style of connector. The DC-to-AC inverter 106 may be 120 VAC/60 Hz, 220 VAC/60 Hz, or any other voltage and frequency output, while the DC-to-DC converter 112 may be a DC-to-DC buck- or boost-converter. Alternatively, the DC-to-AC inverter 106 (or DC-to-DC converter 120) can be removed and the junction box 104 connected directly to the load 108.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. An energy storage system comprising:
a plurality of energy storage devices;
a junction unit for connecting the plurality of the energy storage devices in parallel to a common power bus, the junction unit including a control circuit;
a power conversion unit coupled to the common power bus; and
a protective circuit array including, for each energy storage device, a diode and a switch connected in parallel on a respective input lead inside the junction unit, wherein the control circuit drives the switch to selectively regulate current flow from each energy storage device to prevent current from one energy storage device from flowing to another energy storage device and to control current flow and charge level.

2. The energy storage system according to claim 1, wherein each energy storage device is connected to respective positive and negative input leads in the junction unit, and wherein each positive input lead is coupled to the common power bus.

3. The energy storage system according to claim 2, further comprising a pull-down resistor coupled between the positive and negative input leads connected to each energy storage device.

4. The energy storage system according to claim 1, wherein the power conversion unit coupled to the common power bus comprises a DC-to-AC inverter or a DC-to-DC converter.

5. The energy storage system according to claim 4, further comprising a bus relay coupled between the common power bus and the power conversion unit, wherein the control circuit is configured to open and close the bus relay to selectively connect the common power bus to the power conversion unit.

6. The energy storage system according to claim 5, wherein the control circuit is configured to open the bus relay to selectively disconnect the common power bus from the power conversion unit in response to a fault in the energy storage system.

7. The energy storage system according to claim 2, further comprising a current monitor coupled to each positive input lead and the control circuit, and wherein the control circuit is connected to each positive input lead.

8. The energy storage system according to claim 7, wherein the control circuit is configured to measure, on the positive input lead connected to each energy storage device, a voltage and a current provided by the energy storage device, and wherein the control circuit is further configured to compare the voltages provided by the plurality of energy storage devices.

9. The energy storage system according to claim 8, wherein, when the energy storage system is in an active mode, the control circuit is configured to selectively decouple, from the common power bus, each energy storage device that is producing a voltage that is below a predetermined voltage level, by opening the switch coupled to the positive input lead connected to the energy storage device.

10. The energy storage system according to claim 9, wherein the control circuit is configured to determine the energy storage device providing a highest voltage, and wherein the control circuit is further configured to close the switch coupled to the positive input lead connected to the energy storage device providing the highest voltage.

11. The energy storage system according to claim 10, wherein the control circuit is configured to determine if any of the energy storage devices are providing a voltage within a predetermined range of the highest voltage, and wherein the control circuit is further configured to close the switch coupled to the positive input lead connected to each of the energy storage devices providing a voltage within the predetermined range of the highest voltage.

12. The energy storage system according to claim 9, wherein, when the energy storage system is in a passive mode, the control circuit is decoupled from the energy storage system and all of the switches are opened.

13. The energy storage system according to claim 8, wherein the control circuit is configured to determine a total current provided by the plurality of energy storage devices, and wherein the control circuit if further configured to selectively disable the plurality of energy storage devices by opening all of the switches if the total current is below a predetermined minimum current.

14. A method for supplying current from a plurality of energy storage devices to a power bus, comprising:
   connecting the plurality of the energy storage devices in parallel to a power bus; and
   preventing current from flowing from any of the energy storage devices having too low of a voltage to the power bus, wherein the preventing comprises, for each energy storage device:
      coupling a protection circuit between the energy storage device and the power bus;
      connecting a switch between the energy storage device and the power bus;
      coupling a diode between the energy storage device and the power bus in parallel with the switch;
      measuring a voltage provided by the energy storage device;
      comparing the voltage provided by the energy storage device to a predetermined voltage level; and
      selectively decoupling the energy storage device from the power bus if the measured voltage provided by the energy storage device is lower than the predetermined voltage level.

15. The method according to claim 14, wherein connecting a switch between the energy storage device and the power bus further comprises selectively opening the switch if the measured voltage provided by the energy storage device is lower than the predetermined voltage level.

16. The method according to claim 15, further comprising operating the protection circuits coupled between the energy storage devices and the power bus in a passive mode by opening the switches of the protection circuits.

17. The method according to claim 14, further comprising operating the protection circuits coupled between the energy storage devices and the power bus in an active mode by selectively opening, for each protection circuit, the switch of the protection circuit if the measured voltage provided by the energy storage device is lower than the predetermined voltage level.

18. The energy storage system according to claim 1, wherein each energy storage device includes a respective battery management system configured to monitor voltage, temperature and current.

19. The energy storage system according to claim 18, wherein each energy storage device includes a power relay.

* * * * *